Sept. 20, 1971    C. M. PETRUS    3,606,553
WALLPAPER REMOVING TOOL
Filed June 25, 1969
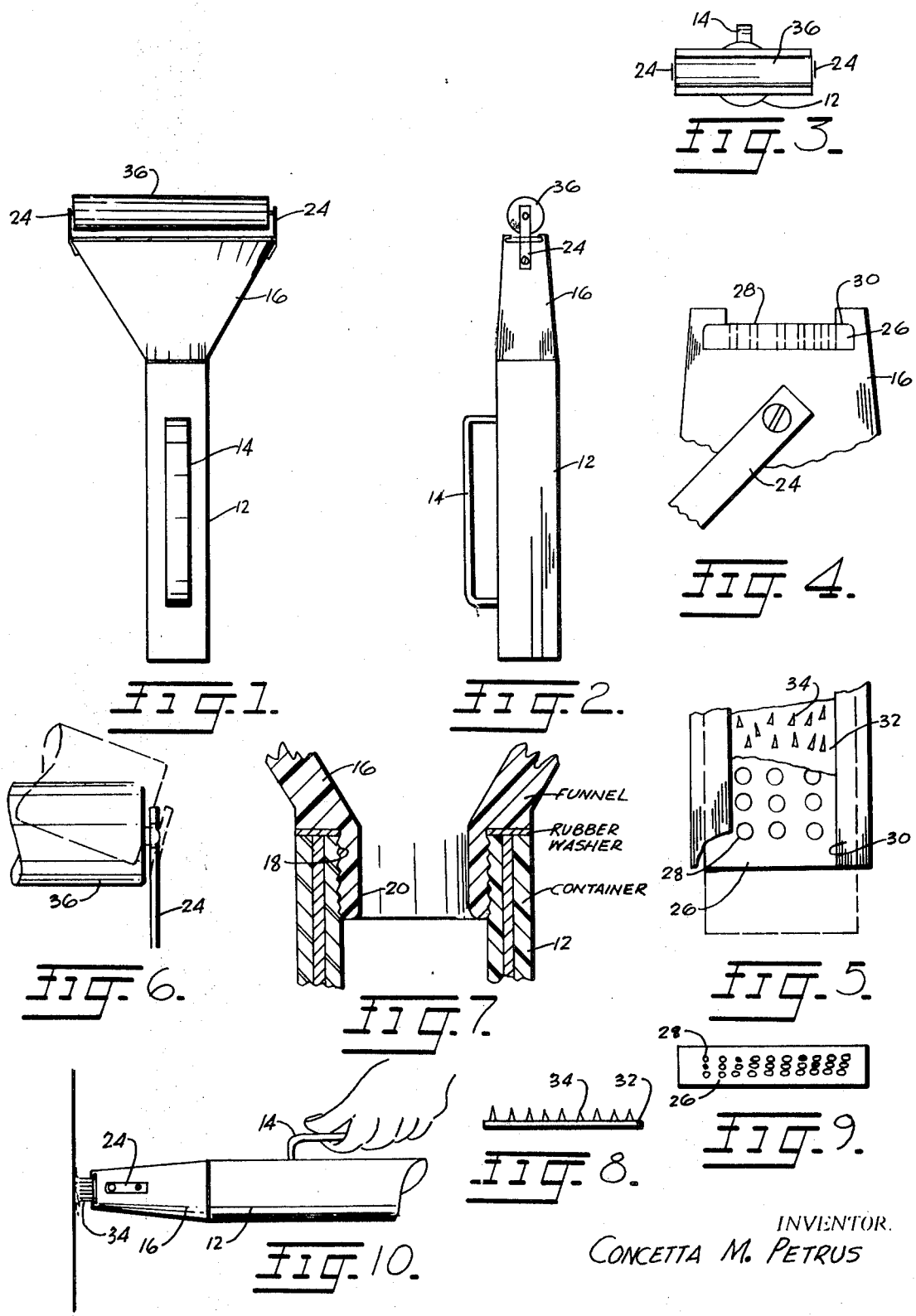
INVENTOR.
CONCETTA M. PETRUS United States Patent Office 3,606,553
Patented Sept. 20, 1971

3,606,553
WALLPAPER REMOVING TOOL
Concetta M. Petrus, 45 Midian Ave.,
Windsor, Conn. 06095
Filed June 25, 1969, Ser. No. 836,337
Int. Cl. A46b 11/00, 17/08
U.S. Cl. 401—39                                       1 Claim

ABSTRACT OF THE DISCLOSURE

A tool for aiding in the removal of wallpaper. The tool has a hollow, elongated container adapted to be filled with a fluid for loosening wallpaper from a wall. The container has a funnel for directing the fluid onto a roller detachably mounted on pivot arms connected to the funnel. The funnel furthermore has a channel in the outer portion thereof for supporting a perforated plate for permitting passage of fluid from the hollow container to the roller when the roller is positioned adjacent the perforated plate and also for supporting a scraper plate when the roller is removed.

SUMMARY OF THE INVENTION

An elongated hollow container with a handle is provided with an opening at one end into which is poured a fluid for loosening wallpaper from a wall. A funnel having a small open end which detachably engages the open end of the container has an opposite larger end containing a channel for supporting a perforated plate through which fluid will pass when the container is shaken and to a removable wall scraper plate. The funnel is further provided with means for detachably and rotatably supporting a roller in such position that the fluid will be shaken thereon when the roller is adjacent the opposite larger end thereof and when the perforated plate is in place, or may be removed from the larger end to permit use of the scraper plate. The roller can thus be operated by manipulation of the tool to roll the fluid onto a wall carrying wallpaper for softening and then away from the larger end of the funnel to permit the scraper plate to be inserted therein and a scraping action to be accomplished.

BRIEF DESCRIPTION OF THE DRAWINGS

In the drawings:
FIG. 1 is a top view of my invention;
FIG. 2 is a side view thereof;
FIG. 3 is an end view thereof;
FIGS. 4, 5, 6, 7, 8 and 9 are detail views of various parts of my invention; and
FIG. 10 is a side view of my invention in one type of use.

DETAILED DESCRIPTION OF PREFERRED EMBODIMENTS

Referring now to FIGS. 1–10, an elongated cylindrical container 12, thermally insulated and typically composed of a thermoplastic, has one end sealed and an opposite end 18 open. Container 12 has handle 14.

A flattened elongated funnel 16 which is hollow and provided with a small round open end 20 threadedly engageable with end 18. Typically container 12 is filled with wallpaper removing fluid such as boiling water with some vinegar therein prior to securing of the funnel. The funnel has an elongated opposite open end 22 with pivotable arms 24 at each side.

The end 22 of the funnel 16 has a suitable channel 30 provided therein for receiving a removable perforated plate 26 and a removable scraper plate 32 selectively positioned to overlie the perforated plate 26.

The perforated plate 26 has a series of small holes 28 therethrough to permit fluid from the container 12 to be selectively passed therethrough. The scraper plate 32 has a series of scraping elements 34 for the removal of the wallpaper from a wall in a manner to be described hereinbelow.

The pivotable arms 24 fixed to the funnel 16 support a roller 36. As shown in FIG. 6, the arms 24 are sufficiently flexible to permit the roller 36 to be easily removed. The purpose of the roller 36 is to selectively apply fluid from the container 12 to the wallpaper in order to loosen same and facilitate its removal.

The novel wallpaper removal tool of this invention operates in the following manner. The container 12 is filled with some fluid to facilitate wallpaper removal, such as boiling water with some vinegar. The funnel 16 is threaded at 18 to the container 12. With the pivot arms in the position shown in FIG. 4, the perforated plate 26 is positioned in the channel 30. The roller 36 is inserted in the pivot arms 24 and is then positioned adjacent the open end 22 of the funnel 16 opposite the perforations 28 in the plate 26. By shaking the container 12, fluid will be selectively dispensed on the roller 36 to be applied to the wallpaper to be removed. With the wallpaper sufficiently loosened, the roller 36 may be removed from the pivot arms 24 and the arms pivoted away from the end 22 of the funnel 16 and the scraper plate 32 is placed over the perforated plate 16 in the channel 30. By manipulation of the scraper plate 32, the wallpaper may be scored by the elements 34 and removed.

Thus it can be seen that there is herein provided a convenient tool for the removal of wallpaper. An insulated container is provided for a fluid to facilitate the paper removal. The container has a funnel which has a channel at its outer end. The channel supports a removable perforated plate for permitting the fluid to be dispensed from the container and a removable scraper plate with scraping elements to remove the paper from the wall. The funnel also supports a roller which may be selectively positioned adjacent the outer end to receive fluid through the perforated plate when the plate is in position or removed from the end when the scraper plate is in its operative position.

While I have described my invention with particular reference to the drawings, such is not to be considerd as limiting its actual scope.

Having thus described this invention, what is asserted as new is:

1. A wallpaper removing tool comprising:
    an elongated hollow thermally insulated container closed at one end and open at the other, said container being adapted to receive a wallpaper loosening fluid;
    a hollow funnel having one small open end adapted to detachably engage the open end of said hollow container and an opposite elongated open end, said elongated open end having a channel formed therein;
    a removable perforated plate inserted within said channel providing fluid communication with the interior of said thermally insulated container;
    a scraper plate removably overlying said perforated plate in said channel, said scraper plate having scraper elements extending outwardly therefrom;
    a roller for selectively transferring the wallpaper loosening fluid from said hollow container to the wallpaper;
    pivot arms attached to said funnel at the elongated open end thereof, said arms releasably supporting said roller selectively in a position immediately adjacent said elongated open end to receive fluid through said perforated plate when said scraper plate is removed or permit said roller to be removed from said elongated open end when said scraper plate is in its position to overlie said perforated plate.

References Cited

UNITED STATES PATENTS

| 2,798,240 | 7/1957 | Jaehne | 401—208 |
| 659,109 | 10/1900 | Smith | 401—219 |
| 812,087 | 2/1906 | Peterson | 401—208X |
| 2,002,598 | 5/1935 | Wood, Jr. | 401—207 |

FOREIGN PATENTS

| 184,830 | 9/1936 | Switzerland. |
| 493,075 | 10/1938 | Great Britain. |
| 1,143,449 | 2/1969 | Great Britain. |
| 285,147 | 5/1931 | Italy. |

ROBERT W. MICHELL, Primary Examiner

R. P. DYER, Assistant Examiner

U.S. Cl. X.R.

401—3, 21